A. H. WELKER.
SOUND REPRODUCER.
APPLICATION FILED FEB. 1, 1919.

1,323,429.

Patented Dec. 2, 1919.

INVENTOR.
Alexander H. Welker
BY
ATTORNEYS.

UNITED STATES PATENT OFFICE.

ALEXANDER H. WELKER, OF KITCHENER, ONTARIO, CANADA, ASSIGNOR TO POLLOCK MANUFACTURING COMPANY, LIMITED, OF KITCHENER, ONTARIO, CANADA, A CORPORATION OF ONTARIO.

SOUND-REPRODUCER.

1,323,429. Specification of Letters Patent. Patented Dec. 2, 1919.

Application filed February 1, 1919. Serial No. 274,559.

*To all whom it may concern:*

Be it known that I, ALEXANDER H. WELKER, a subject of the King of Great Britain, residing at Kitchener, in the county of Waterloo, Province of Ontario, Canada, have invented certain new and useful Improvements in Sound-Reproducers, of which the following is a specification.

My invention relates to improvements in sound reproducers and particularly to the pivotal bearing for the lever or connection by which the reproducing needle is connected to the diaphragm of the sound-box. In some forms of reproducer, the casing of the sound-box is provided with pointed pins or thrust members, the ends of which engage in conical recesses formed in bearing members secured to opposite sides of the lever by which the movement of the reproducing needle is transmitted to the diaphragm. There is sometimes a tendency to bind between the coacting members of such a bearing because of changes in temperature or for other reasons, because of which freedom of movement of the parts is impeded and the reproduction of the record being tracked will accordingly not be as good. My invention overcomes this difficulty by providing sufficient resiliency between the coacting members of a bearing of the character referred to, to prevent binding of the parts under temperature variations or the like, once the parts have been properly adjusted. This is accomplished in the preferred form of my invention by forming one of the bearing members of a suitable sufficiently resilient metal, which is provided with an opening therethrough at right angles to the axis of the thrust member which engages the same. The bearing is split or cut from this central opening to the outer surface adjacent to the thrust member and the recess in which the thrust member is seated is situated with its axis in the plane of separation thus formed. The result of this construction is that the bearing member engages the end portion of the thrust member with sufficient friction but with a certain amount of resiliency so that binding between the thrust member and its bearing will be prevented.

In order that a clearer understanding of my invention may be had, attention is hereby directed to the accompanying drawings forming part of this application and illustrating one embodiment of my invention.

Figure 1:
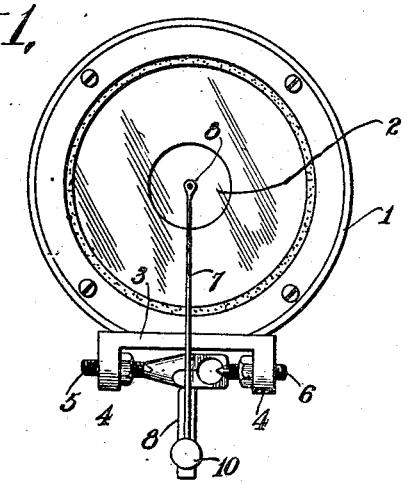
Figure 2:
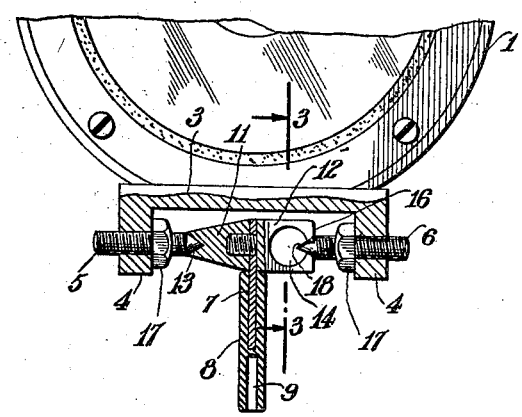
Figure 3:
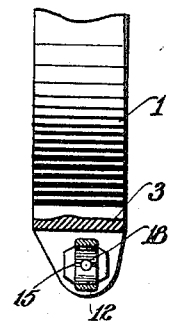

In the drawings, Figure 1 represents a front elevation of a reproducer sound-box provided with my invention; Fig. 2 is an enlarged partial view of the same with certain parts shown in section; and Fig. 3 is a vertical section taken on line 3—3 of Fig. 2.

Referring to the drawings, the sound-box is provided with a casing in which a diaphragm 2 is secured in any usual manner. A bracket 3 is secured to one edge of the sound-box casing, this bracket having outwardly extending portions 4, 4, provided with screw-threaded openings through which the screw-threaded thrust pins 5 and 6 are screwed. The lever 7 of usual construction is secured or connected in any usual manner to the diaphragm, as is indicated at 8. The opposite end of this lever has secured thereto a member 8 provided with a socket 9 in which the usual reproducing needle may be secured as by means of the screw 10.

The lever 7 has secured thereto or integral therewith a bearing member or members extending outwardly on opposite sides of the lever as is indicated at 11 and 12. One of these bearing members such as that illustrated at 11 may be provided at its outer end with a conical recess in which the pointed end portion 13 of the thrust screw 5 is adapted to seat. The other bearing member 12 is provided with an opening 14 extending therethrough at right angles to the axis of the screw-threaded thrust member 6, this opening 14 being sufficiently large to leave a comparatively thin wall between the same and the outer surfaces of the member. The member 12 is split or cut, as is indicated at 15, from the central opening 14 to the surface 16 of the bearing member which is adjacent to the thrust member 6. The seating recess for the member 6 extends through this outer surface of member 12 in which the cut 15 has been formed with the axis of the recess in the plane of separation between the upper and lower portions of the outside surface 16 of the bearing member.

When the device is assembled, the thrust members 5 and 6 will be screwed into engagement with their seating recesses in the bearing members 11 and 12, the thrust members being held in properly adjusted position by means of the nuts 17, 17. When so adjusted, the pointed end 18 of the thrust member 6 will extend somewhat into the central opening 14 of bearing member 12, and the portions of the bearing member engaging against the surface of the end portion 18 of thrust member 6 will engage the same resiliently, the member 12 being formed of suitable resilient metal, such as steel. The resiliency of the metal will be sufficient to permit the same to yield slightly under temperature variations, which otherwise would cause binding between the thrust member and the bearing.

What I claim is:—

1. In a sound reproducer, the combination of a sound-box casing, a diaphragm therein, a lever connected at one end to said diaphragm, and adapted to carry a reproducing needle, and a pivotal connection for said lever, comprising thrust members and bearing members therefor arranged on opposite sides of said lever, secured to said casing and lever, one of said thrust members having a pointed end and the bearing member therefor being split, with portions on opposite sides of the plane of separation arranged to press resiliently against the pointed end portion of said thrust member.

2. In a sound reproducer, the combination of a sound-box casing, a diaphragm therein, a lever connected at one end to said diaphragm, and adapted to carry a reproducing needle, and a pivotal connection for said lever, comprising thrust members and bearing members therefor arranged on opposite sides of said lever, secured to said casing and lever, one of said thrust members having a pointed end and the bearing member therefor being of resilient metal, with an opening therethrough at right angles to the axis of said thrust member, said bearing member being split through from said opening to the surface adjacent said thrust member, and having a recess to receive the end portion of said thrust member with its axis in the plane of separation.

This specification signed and witnessed this 9 day of January, 1919.

ALEXANDER H. WELKER.

Witnesses:
RUBIE M. FISHER,
E. W. CLEMENT.